United States Patent [19]

Luchsinger

[11] Patent Number: 4,798,333

[45] Date of Patent: * Jan. 17, 1989

[54] PORTABLE SPRAYER WITH IMPROVED COMBINATION OF PISTON AND DIAPHRAGM PUMP

[76] Inventor: Pedro W. Luchsinger, Panamericana 445, Lagos de Moreno, C.P. 47400, Jalisco, Mexico

[*] Notice: The portion of the term of this patent subsequent to Sep. 6, 2005 has been disclaimed.

[21] Appl. No.: 77,352

[22] Filed: Jul. 24, 1987

Related U.S. Application Data

[63] Continuation-in-part of Ser. No. 845,631, Mar. 28, 1986, Pat. No. 4,768,714, which is a continuation-in-part of Ser. No. 616,012, May 31, 1984, abandoned.

[51] Int. Cl.⁴ .............................................. B05B 9/43
[52] U.S. Cl. .................................... 239/142; 239/333; 92/99
[58] Field of Search ............... 239/333, 330, 362, 142, 239/363; 411/373, 374; 92/102, 98 R, 99–101; 222/383

[56] References Cited

U.S. PATENT DOCUMENTS

| | | |
|---|---|---|
| Re. 27,382 | 5/1972 | Schlosser ........................... 417/439 |
| 536,092 | 3/1895 | Myers . |
| 597,576 | 1/1898 | Gaskins . |
| 669,819 | 3/1901 | Brooks . |
| 886,863 | 5/1908 | Riebenack . |
| 924,501 | 6/1909 | Sala . |
| 947,536 | 1/1910 | Wenkel . |
| 983,729 | 2/1911 | Laidley . |
| 1,047,791 | 12/1912 | Gregg . |
| 1,096,463 | 5/1914 | Schorn . |
| 1,140,453 | 5/1915 | Frank . |
| 1,428,928 | 9/1922 | Whaley . |
| 1,429,829 | 9/1922 | Baker . |
| 1,456,089 | 5/1923 | Baker . |
| 1,659,817 | 2/1928 | Halvorsen . |
| 1,783,882 | 12/1930 | Kohn . |
| 1,787,751 | 1/1931 | Mathewson . |
| 1,799,704 | 4/1931 | Riley . |
| 1,979,135 | 10/1934 | Altenburger et al. .............. 299/111 |
| 1,985,282 | 12/1934 | Carter ................................ 103/150 |
| 2,017,145 | 10/1935 | Dunn ................................... 299/96 |
| 2,070,421 | 2/1937 | Chisholm et al. .................. 137/153 |
| 2,139,313 | 12/1938 | Neubauer .......................... 251/119 |
| 2,162,057 | 6/1939 | Brandt et al. ....................... 299/97 |
| 2,192,256 | 3/1940 | Brandt ................................ 299/97 |
| 2,284,316 | 5/1942 | Glass ................................... 158/79 |
| 2,515,568 | 7/1950 | Pharo ................................. 222/401 |
| 2,569,903 | 10/1951 | Santarelli .......................... 222/263 |
| 2,577,572 | 12/1951 | Ferber ......................... 222/383 X |

(List continued on next page.)

FOREIGN PATENT DOCUMENTS

| | | |
|---|---|---|
| 480511 | 1/1952 | Canada . |
| 176781 | 10/1906 | Fed. Rep. of Germany ............ 45/4 |
| 260852 | 12/1902 | France . |
| 907813 | 5/1944 | France ........................................ 1/1 |
| 1214265 | 4/1960 | France ................................. 92/98 R |

Primary Examiner—Andres Kashnikow
Assistant Examiner—Kevin P. Weldon
Attorney, Agent, or Firm—Gausewitz, Carr & Rothenberg

[57] ABSTRACT

A backpack agricultural sprayer has a pressure vessel mounted within a container and connected to a high pressure piston pump to force liquid into the pressure vessel from which it may be discharged for spraying. Leakage of liquid past the sprayer pump is contained by a leak-proof diaphragm which defines an agitation chamber connected by a conduit to the interior of the sprayer container. The diaphragm and piston are connected to be operated together to provide two separate but simultaneously acting pumps. The piston pump pressurizes the pressure vessel, and the diaphragm pump forces liquid back and forth between the container and diaphragm chamber to agitate contents of the container. An unique piston skirt is clamped by a single bolt between a skirt retainer and a piston body to provide a unitary assembly of diaphragm, piston body, skirt and skirt retainer. The skirt is resiliently urged outwardly to improve sealing and compensate for wear. The diaphragm chamber cover is threaded to the pump housing so that the cover may be removed for repair or replacement of the inner pump parts.

U.S. PATENT DOCUMENTS

| | | | |
|---|---|---|---|
| 2,621,971 | 12/1952 | Zublin | 299/88 |
| 2,753,080 | 7/1956 | Bartlett | 222/82 |
| 2,834,299 | 5/1958 | Coffey | 92/102 X |
| 2,853,015 | 9/1958 | Pleuger | 103/44 |
| 2,888,034 | 5/1959 | Glegg | 137/512.4 |
| 2,935,248 | 5/1960 | Gerteis | 230/231 |
| 3,094,281 | 6/1963 | Myers | 237/63 |
| 3,399,836 | 9/1968 | Pechstein | 239/333 |
| 3,473,726 | 10/1969 | Bachmann | 230/45 |
| 3,508,849 | 4/1970 | Weber | 417/454 |
| 3,673,369 | 6/1972 | Weaver | 92/102 X |
| 3,887,305 | 6/1975 | Ito | 417/439 |
| 3,908,520 | 9/1975 | Ma | 92/94 |
| 4,047,854 | 9/1977 | Penn | 222/383 X |
| 4,319,570 | 3/1982 | Grane | 128/278 |
| 4,400,123 | 8/1980 | Dunegon | 411/373 |
| 4,456,176 | 6/1984 | Agius | 239/142 |

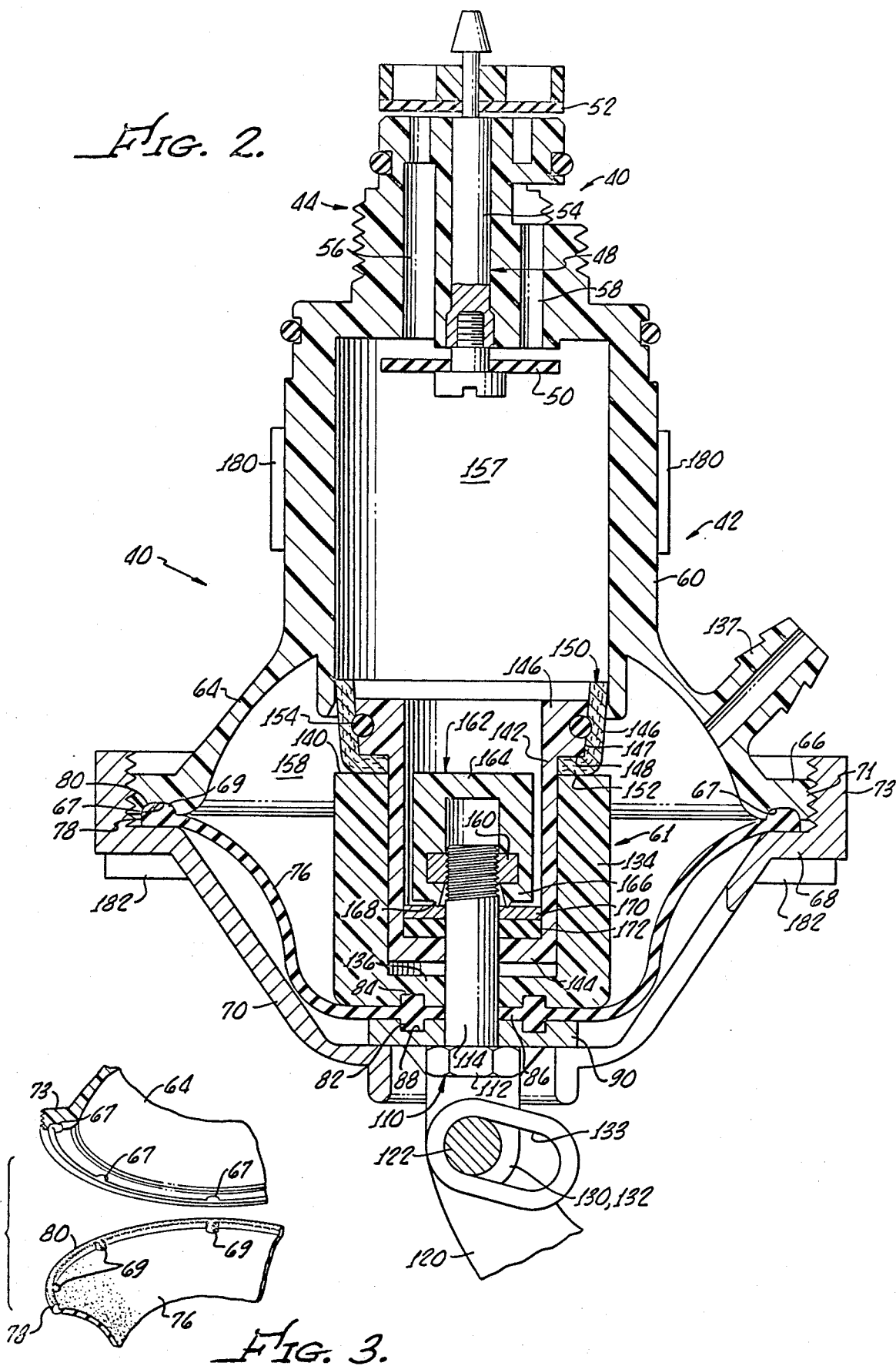

PORTABLE SPRAYER WITH IMPROVED COMBINATION OF PISTON AND DIAPHRAGM PUMP

This application is a continuation-in-part of my prior application, Ser. No. 845,631 for Portable Sprayer With Leak Control Agitator, filed Mar. 28, 1986, now U.S. Pat. No. 4,768,714, which application in turn is a continuation-in-part of my prior application Ser. No. 616,012 for Sprayer and Diaphragm Pump Therefor, filed May 31, 1984, now abandoned. The disclosures of both of these applications are incorporated by reference herein as though fully set forth.

BACKGROUND OF THE INVENTION

The present invention relates to agricultural sprayers of pressurized liquids, and more particularly concerns an improved pump design for such a sprayer in which liquid is agitated and in which piston leakage is contained.

Pressurized discharge of various types of liquid insecticides, fertilizers, herbicides and other agricultural-type treatment liquid has been accomplished by directly pressurizing a pressure vessel that is mounted within a portable liquid container. Pressure is produced by a pump also connected to the container and pressure vessel. Liquid is drawn from the container, caused to flow under pressure into the pressure vessel and sprayed therefrom under control of a spraying valve.

Most sprayers need but do not provide agitation of container contents. Efficient spraying of agricultural insecticides, herbicides and the like requires control of the amount of insecticide dispensed. Manufacturers of spraying chemicals recommend preferred use rates for efficient application of the chemicals. These rates specify the amount of chemical to be used per acre. However, recommended rates can be met only if the spraying equipment is able to control the solution strength, in addition to controlling pressure and output flow rate. For some materials, solution strength depends on the amount of non-soluble but wettable particles maintained in suspension within the solution. In such suspensions, agitation is required to minimize precipitation of solid particles so as to maintain solution strength.

In many sprayers employing piston pumps, the life of the sprayer is often related directly to the life of the pump piston, because leakage of the liquid past a worn pump piston must be avoided. Liquids to be sprayed are often toxic and leakage from the sprayer may cause severe damage to the person of the operator or other contamination of operator or equipment. Moreover, new government regulations may restrict the amount of leakage that can be acceptable in a sprayer of toxic material. To increase the sprayer life and minimize the leakage problem, it has been suggested, as described in my prior application Ser. No. 616,012, referred to above, to replace the piston with a diaphragm pump which is not subject to the wear of the piston and which can be more readily and completely sealed for longer pump life. However, the diaphragm pump, although possessing a number of advantages, cannot provide as high an output pressure as a piston pump. Therefore, a piston pump is preferable to a diaphragm pump in many applications.

A sprayer having combined piston and diaphragm pumps for both high pressure discharge spraying and agitation by means of the action of the diaphragm is described in my co-pending application Ser. No. 845,631, referred to above, and is effective and satisfactory. Nevertheless, the unique cooperation of the tandem, dual pumping action of the adjoining piston pump and diaphragm pump introduces unique problems in maintaining high pressure for spray discharge, maximized assurance of leak containment, simplicity of assembly and ease of disassembly for repair or replacement.

Accordingly, it is an object of the present invention to provide a portable back sprayer having both high pressure discharge spraying and agitation by means of an improved dual pump assembly.

SUMMARY OF THE INVENTION

In carrying our principles of the present invention, in accordance with a preferred embodiment thereof, a liquid dispensing sprayer and agitator for spraying insecticides, herbicides and the like includes a pressure vessel mounted within a container and dual pump means connected to the container and pressure vessel for pumping liquid from the container into the pressure vessel and for agitating contents of the container. The pump includes a piston housing section and a diaphragm housing section, with a sealed diaphragm extending across the pump chamber. A piston secured to the diaphragm and slidably mounted within the piston housing includes a cup-shaped piston body having a closed end, a skirt retainer fixed to the piston body and having an outer annular surface, and a sealing skirt mounted on the outer surface of the skirt retainer. Resilient means interposed between the sealing skirt and skirt retainer urge the skirt radially outwardly of the retainer. The arrangement includes valve means connecting the pump chamber, pressure vessel and container, a discharge tube connected with the pressure vessel and an agitator conduit connected between the container and the diaphragm chamber so that when the piston and diaphragm are driven together, liquid under pressure is pumped into the pressure vessel, and liquid is pumped from the diaphragm chamber so that liquid within the container is agitated. According to another feature of the invention, a single fastener rigidly holds the piston skirt, skirt retainer, piston body and diaphragm in a tightly clamped unitary configuration. According to a further feature of the invention, the two pump housing sections are threadedly connected together to detachably clamp and tightly seal an unique configuration of diaphragm peripheral lip, thereby ensuring tight sealing, long life and removability of the diaphragm and piston unit for servicing.

BRIEF DESCRIPTION OF THE DRAWINGS

FIG. 2 is a sectional elevation view of the combined piston and diaphragm pump assembly detached from the sprayer of FIG. 1; and FIG. 3 is an exploded pictorial view of parts of the diaphragm and housing section, showing the anti-rotation configuration of the parts.

DESCRIPTION OF A PREFERRED EMBODIMENT

Figure 1:
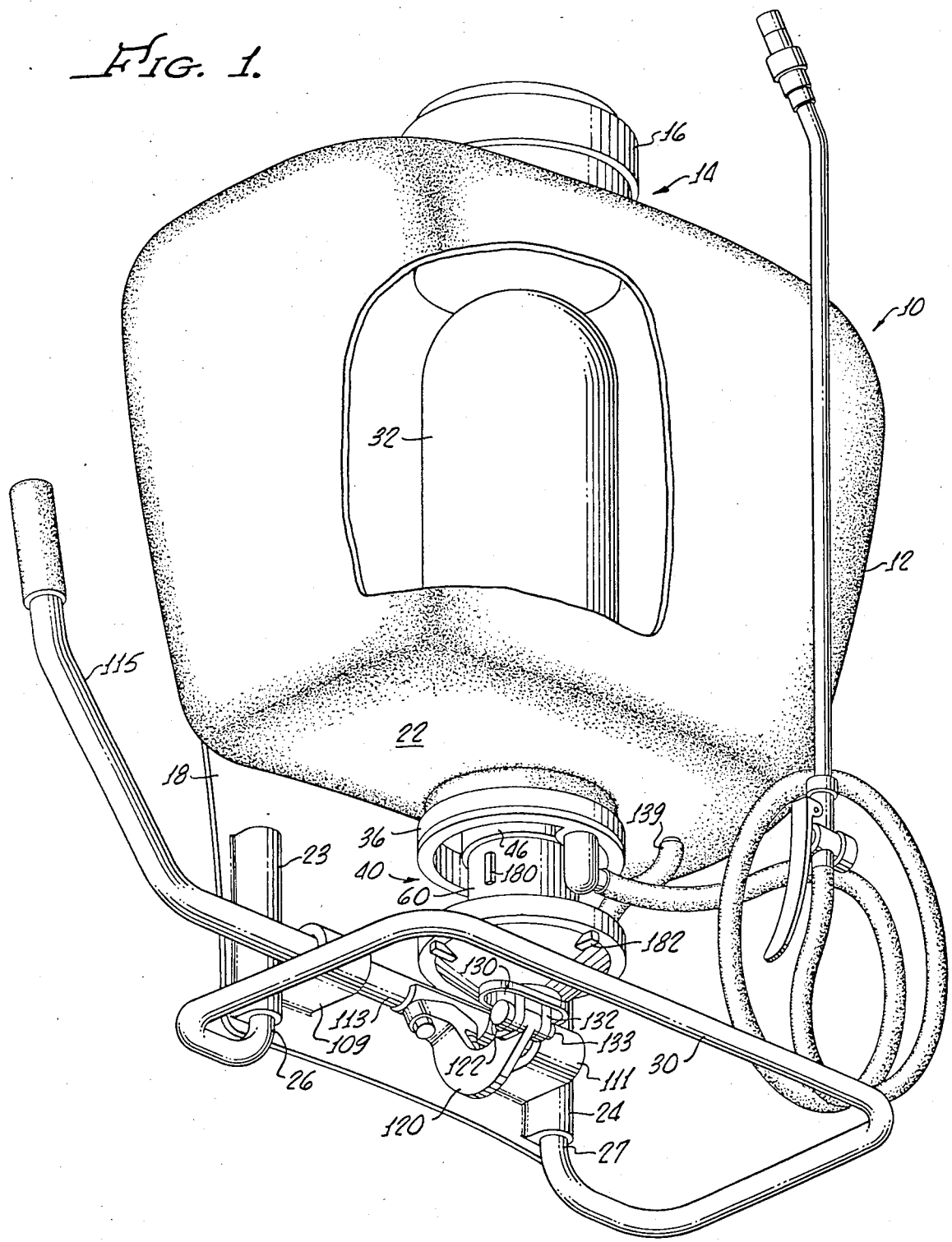
FIG. 1 is a pictorial illustration, with parts broken away, showing a backpack sprayer embodying principles of the present invention.

Illustrated in the drawings is a portable backpack sprayer of insecticides, herbicides, fungicides and other chemicals, including suspensions of wettable powders.

The sprayer has a novel pumping assembly incorporating a pair of pumps, of which one is a piston pump capable of providing high pressure for the interior of the pressure vessel and having a long life. The other pump is a diaphragm pump which is arranged to perform three functions. First, it provides a repetitive pulsating, high velocity jet that is projected into the interior of the container for agitation of the contents thereof. Second, the diaphragm pump is positioned to receive, contain and confine liquid that may leak past the piston skirt, liquid that would otherwise leak from the pumping apparatus to contaminate the operator and his clothing. Third, the diaphragm itself acts as a return spring for both pumps, providing a resilient over-the-center snap action that assists both pressure and suction strokes of both piston and diaphragm. The arrangement is such that the entire interior of the pumping apparatus, including the pumping chamber, the agitation chamber and, of course, the interior of the pressure vessel and container itself, are all readily flushed and cleaned with clear flushing water that can flow into all areas of the interior of the apparatus and which can be readily flushed therefrom.

Improved construction of the assembly of dual pumps provides a piston assembly capable of producing a significantly higher pressure and having an increase life span. Also included is an improved mounting for the diaphragm to enhance the sealing of the diaphragm and to enable ready access to the pump components for repair or replacement.

As shown in FIGS. 1 and 2, a plastic container 10 is formed of a plastic body 12 having a fill neck 14, providing an opening that is closed and sealed by a detachable screw-type cap 16. A back supporting panel 18 that is an integral portion of the back wall of the container 10 extends downwardly for a distance below the bottom 22 of the container and includes enlarged bosses 23,24 for fixed reception of vertical leg portions 26,27 of a generally rectangular supporting frame 30.

A vertically elongated plastic pressure vessel 32 extends within the container 10 from an upper portion of the container substantially vertically downwardly to be securely mounted in a bottom opening formed by a depending skirt portion of the container. A container circumscribing clamp 36 fixedly but detachably secures the pressure vessel 32 to and within the container skirt opening. The lower end of the pressure vessel is formed with an internally threaded fitting which threadedly receives a valve and dual pump assembly 40. The valve and pump assembly includes a plastic pump housing 42 having an upper, externally threaded smaller diameter connecting section 44 that is threadedly received in and sealed to an internally threaded opening formed in the bottom portion 46 of the pressure vessel 32. Mounted in connecting section 44 is a valve assembly 48 having valve discs 50 and 52 connected to opposite ends of a shaft 54 to provide one-way flow respectively through an output pressure conduit 56 and an input conduit 58, which provide communication between the interior of the pump housing and the pressure vessel (via output pressure conduit 56) and the container (via input conduit 58). The high pressure piston pump is formed in part by the pump and valve housing 42 which includes an intermediate cylindrical piston housing section 60 in which is slidably mounted and received a hollow piston assembly 61. Piston housing section 60 merges with an integral downwardly and outwardly flaring diaphragm housing section 64 having a circular peripheral edge flange 66 that mates with a circular peripheral edge flange 68 of a frustoconical cover section 70. Diaphragm housing section 64 and cover section 70 are fixedly but detachably interconnected by means of an outwardly threaded peripheral end 71 of housing section 64, which engages a axially extending, internally threaded flange 73 that is integral with and projects axially from the circular peripheral edge flange 68 of the cover section 70.

The secondary, or diaphragm, pump is formed in part by a a deep bell-shaped diaphragm 76, having a peripheral circular edge 78 formed with a continuous circumferential bead 80 that is clamped at its edge between edge flange 66, which has a continuous annular groove that receives bead 80, and edge 68, to thereby compress bead 70 to firmly secure and effectively seal the diaphragm around its periphery without use of any bolts or screws. This totally eliminates any leaking apertures needed for such bolts or screws. Such apertures are a common cause of leaks in most diaphragm pump modules because the diaphragm tends to tear at the holes.

Because the diaphragm is subject to frictional forces tending to rotate it as the cover section 70 is screwed down upon the diaphragm housing section 64, means are provided to avoid such rotation. Such means are formed by a plurality of apertures, such as apertures 67 formed in or extending through the flange 66 of flared housing section 64, and a plurality of radially extending circumferentially spaced rotation restraining projections 69 formed integrally with the circumferential edge and bead of the diaphragm and individually received in the respective ones of the recesses 67. Further, the lower surface of the diaphragm edge, which is in contact with the clamping cover section edge 68, is lubricated to facilitate sliding of the cover section relative to the diaphragm as the cover section is rotated.

The diaphragm is made of a stiff resilient material, which in unstressed condition has the configuration illustrated in FIG. 3. The diaphragm moves during pumping action from the position illustrated in FIG. 1 to an inner position, during which motion the diaphragm moves to a reverse bell-shaped configuration. Stiffness and resilience of the diaphragm are such that the diaphragm, when in its innermost position, is strongly urged by the stress of its flexed condition to return to its unstressed configuration illustrated in FIG. 1. In effect the diaphragm acts as a spring which allows the diaphragm to be flexed during the pumping action, as will be described below, but which provides a strong resilient returning force that urges the diaphragm and the attached piston back to the position illustrated in FIG. 3.

The diaphragm is formed with first and second circular sealing ribs 82,84 projecting from opposite sides of a substantially flat central section 86 thereof. Rib 82 is received in circular groove 88, formed in a surface of a connecting fitting 90, which is positioned between the diaphragm and the cover section, and has a pair of spaced depending ears 130,132 carrying a drive pin 122 that is received in an elongated slot 133 formed in the end of a crank 120. Crank 120 is fixed to a drive shaft 113 (FIG. 1), horizontally extending and pivotally mounted in lugs 109,111 fixed to support panel 18 and having an upwardly extending handle portion 115. A bolt 110, having a head 112 and a shank 114, extends through an aperture in connecting fitting 90 and through a hole in the diaphragm 76 to rigidly connect the piston assembly 61 to the diaphragm assembly and connecting fitting 90.

The piston assembly 61 comprises a hollow cylindrical piston body in the form of a cup 134, having a closed inner portion 136 positioned directly against the inner surface of the mid-section of the diaphragm and having a groove for receiving the inner rib 84 of the central portion of the diaphragm. The open end of piston body 134 terminates in an annular clamping end face 140.

Snugly mounted within the hollow piston body 134 is a hollow cylindrical skirt retainer 142 having a closed end portion 144 positioned adjacent to but spaced from the inner surface of the closed piston body end 136. The open inner end of the skirt retainer is radially outwardly enlarged, as at 146, to provide a frustoconical outer face 147 and an inwardly facing annular clamp shoulder 148 that faces the clamping end face 140 of the piston body. A frustoconical piston skirt 150, made of oiled leather, or the like, has an inner surface pressed against the mating conical outer surface 147 of the retainer enlarged end 146 and includes an integral, annular, radially inwardly projecting clamping flange 152 captured and clamped between the clamping shoulder 148 of the retainer and the clamping end face 140 of the piston body.

A resilient member, such as an o-ring 154, is received in an annular groove formed in the outer conical face 147 of retainer enlarged end 146 and projects radially outwardly therefrom to contact the inner wall of leather skirt 150 and resiliently urge this wall radially outwardly.

A threaded nut 160 is threadedly engaged with threads on the end of bolt 110 and is fixedly connected to and completely embedded within a nylon sealing nut cap 162, having a closed inner end 164 and an open end 166 upon which is formed an axially projecting sealing edge 168 that abuts a stainless steel disc 170 surrounding the bolt and positioned adjacent a resilient washer 172. The latter surrounds the bolt and is interposed between the disc 170 and the inner face of closed end 144 of the skirt retainer 142. Washer 170 is stainless steel, and resilient washer 172 is Viton rubber. The piston body 134 and skirt retainer are made of a strong corrosion resistant plastic.

Piston housing section 60 is formed with a plurality of circumferentially spaced outwardly projecting tool receiving lugs 180, and the cover section 70 also is formed with a plurality of circumferentially spaced and outwardly projecting tool receiving lugs 182. The lugs facilitate gripping of these two parts to effect the relative rotation needed for threadedly engaging or disengaging the two and to assure proper clamping action to firmly seal the peripheral edge of the diaphragm.

Outwardly flared diaphragm housing section 64 is formed with an upwardly and outwardly projecting connecting fitting 137, to which is securely attached a flexible agitator conduit 139, having its other end connected to a fitting (not shown) that is threaded in and connected to the container at its bottom 22. Thus the conduit 139 is connected to the interior of the container and may be provided with a jet nozzle (not shown) that has a combined input and output port oriented to direct liquid projected from the nozzle in a selected direction, such as, for example, horizontally, so that liquid projected into the container bottom will tend to flow in a continuous or swirling path around the container bottom. Position and orientation of the jet nozzle within the container bottom are selected to provide an input flow of the projected high velocity stream that will give maximized agitation.

The volume above the pump piston within the piston housing section 60 may be termed a piston pressure chamber 157. The volume defined between the outer surface of the piston cup body 134, the upper surface of the diaphragm 76 and the outwardly flared diaphragm housing section 64 forms a diaphragm or agitator chamber 158 which is pressurized by the upward motion of diaphragm and piston during the upward or pressure stroke.

In operation, reciprocating pumping of the handle 115 reciprocate; the unitary assembly of diaphragm and piston in pumping and suction strokes, moving the assembly in a pumping stroke from the position illustrated in FIG. 1 upwardly to pressurize the piston chamber 157 and concomitantly pressurize agitating chamber 158. During the pressure stroke fluid flows from the pumping chamber through the conduit 56 into the pressure vessel 32. During this stroke fluid also flows from the agitating chamber 158 through the conduit 139 into the bottom area of the container. During the return suction stroke the assembly of diaphragm and piston move downwardly to the position illustrated in FIG. 1, aided by the resilience of the diaphragm. During this stroke fluid is drawn into the pumping chamber 157 from the container via conduit 58, and fluid surges back to the agitator chamber 158 from the container through the agitator conduit 139.

The described piston and diaphragm assembly provides a simplified arrangement for assembling the various components, and yet enables the piston pump to provide extremely high pressure with a long life. An exemplary embodiment of the invention, built in accordance with the configuration illustrated in the drawings, has operated successfully for over two million strokes and produces a pressure of up to 196 pounds per square inch. The oiled leather piston skirt, being pressed resiliently outwardly against the inner walls of the piston chamber 157 by the resilient member 154, forms a very tight seal against the high pressure produced within the piston chamber, and yet has an unusually long life. The long life is due in part to the fact that, as the piston skirt wears in the course of its continuous rubbing against the cylinder walls, the skirt is continuously urged outwardly by the resilient o-ring 154, and this outward urging compensates to a significant extent for the wear on the outer edge of the skirt.

The entire assembly of diaphragm, piston, skirt and skirt retainer is held together by the single bolt 110 and nut 160 (including nut cap 162). The very same action of the nut and bolt that holds the piston body 134 pressed against the central section of the diaphragm also firmly clamps the skirt retainer 142 to the piston body 134, and, at the same time, clamps the piston skirt via its interposed flange 148 between the skirt retainer and the piston body. The nut cap 162 has a noncircular external configuration, hexagonal for example, to receive a very thin-walled wrench to hold the nut cap and thereby hold the nut 160 against rotation as the bolt 110 is turned by means of a wrench applied to the bolt head 112. Tightening of the nut 160 and nut cap 162 upon the bolt 110 moves the nut cap closer to the stainless steel disc 170, deforming the sealing edge 168 which is flattened against the stainless steel disc 170 to provide a very effective and tight seal of the bolt. The bolt is thus protected from the corrosive liquids in the pumping chamber. As the nut cap 162 presses against the stainless steel disc 170, the latter presses against the inner closed end 144 of the skirt retainer by means of the interposed resilient washer 172. The latter is thus deformed to provide a tight and effective seal around the smooth bolt shank. Pressure exerted against the inner end of the skirt retainer is transferred by the skirt retainer enlargement 146 to the radially extending inwardly directed annular flange 148 of the leather sealing skirt 150. The skirt is thus rigidly clamped in position between the skirt retainer and the piston body 134. Moreover, this pressure of the sealing skirt flange against the end of the piston body 134 is axially directed and presses the piston body downwardly, as illustrated in FIG. 1, against the central portion of the diaphragm. Thus the diaphragm is also firmly clamped between the yoke fitting 90 and the inner closed end 136 of the piston body by the bolt 110 and its nut.

A tight seal of the diaphragm is achieved by the threaded interconnection of cover flange 68 and flared housing section flange 66 with the interposed diaphragm therebetween. This arrangement tightly and rigidly seals the diaphragm in leak tight relation to and between the two housing sections, and yet enables the assembly to be readily taken apart. The cover 70 is removed by rotation of the cover relative to the housing section 64, thus exposing the entire assembly of piston and diaphragm for ready replacement or disassembly and repair. No holes are needed or employed in the diaphragm to hold the diaphragm in place, and thus such sources of potential leakage and weakening of the diaphragm are eliminated. The only hole in the diaphragm is the central hole for bolt 110 which is effectively sealed by the described components.

Thus it will be seen that the described construction of the piston and diaphragm pump assembly in a dual pump enhances the leak containment action of the diaphragm by the unique clamping securement of the diaphragm edge between the two threadedly engaged housing parts, and at the same time provides an improved interconnection between the diaphragm and the piston by a single bolt and nut assembly that effectively and securely mounts the piston skirt to the piston, the piston to the diaphragm, and both of these to the operating handle, all provided with maximum sealing and leak containment.

The novel diaphragm edge configuration and lubrication cooperates with the threaded housing sections to enable the parts to be easily assembled and disassembled with minimum disturbance of the diaphragm. Thus an unique, improved and significantly more efficient combination of high pressure spray discharging piston pump together with a diaphragm actuated agitation is provided for optimum spraying results.

The foregoing detailed description is to be clearly understood as given by way of illustration and example only, the spirit and scope of this invention being limited solely by the appended claims.

What is claimed:

1. A liquid dispensing sprayer and liquid agitator for spraying insecticides, herbicides and the like including suspensions of wettable powders, comprising:
    a container adapted to be carried on the back of a person,
    a pressure vessel mounted within said container, and dual pump means connected to the container and pressure vessel for pumping liquid from said container into said pressure vessel and for agitating contents of said container, said pump means comprising:
        a piston housing section,
        a diaphragm housing section connected to one end of said piston housing section,
        a housing cover connected and sealed to said diaphragm housing section and cooperating therewith to partly define an operating pump chamber,
        a diaphragm extending across said pump chamber and having a peripheral edge captured and sealed between said cover and diaphragm housing section, said diaphragm cooperating with said diaphragm housing section to define an agitator pump chamber, and
        a piston assembly secured to said diaphragm and slidably mounted within said piston housing section, said piston assembly comprising:
            a piston body having a closed end,
            a skirt retainer fixed to said piston body and having an outer annular surface,
            a sealing skirt mounted on said outer surface of said skirt retainer, and
            resilient means interposed between said sealing skirt and said skirt retainer for urging said skirt radially outwardly of said retainer,
    valve means for connecting the interior of said piston housing section with the interior of said pressure vessel and with the interior of said container,
    a discharge tube connected with the pressure vessel for spraying liquid under pressure,
    an agitator conduit having a nozzle end in fluid communication with the interior of said container and having a pump end in fluid communication with said agitator pump chamber, and
    means for concomitantly driving said piston assembly and diaphragm, whereby liquid under pressure is pumped from the container into the pressure vessel by the piston assembly, and the diaphragm draws liquid from the container into the agitator pump chamber and projects liquid from the agitator pump chamber back into the container in a high velocity stream.

2. The sprayer of claim 1 wherein said piston body has a forward end, said skirt retainer having an annular clamping shoulder facing the forward end of said piston body, said sealing skirt including a radially inwardly directed flange captured between said clamping shoulder and piston body forward end, and means for pressing said skirt retainer against the piston body to firmly clamp said skirt flange between the skirt retainer and piston body.

3. The sprayer of claim 2 wherein said means for pressing the skirt retainer against the piston body comprises elongated fastener means extending through said diaphragm and into said piston body for rigidly securing the piston body to the diaphragm, said skirt retainer including a holding portion thereof interposed between a portion of said elongated fastener and said piston body, whereby the fastener presses the skirt retainer toward the piston body end.

4. The sprayer of claim 3 wherein said piston body comprises a hollow piston cup having a closed end positioned against a central portion of the diaphragm, said skirt retainer comprising a hollow retainer cup having a body extending into said piston cup and having a closed end defining said holding portion, said closed end being adjacent to but spaced from the closed end of said piston cup, said skirt retainer having an enlarged forward end defining said clamping shoulder, said elongated fastening means comprising a bolt extending through said diaphragm and through the closed ends of said piston cup and retainer cup, and nut means on the end of said bolt within said retainer cup for pressing the closed end of said retainer cup toward the closed end of said piston cup to thereby press said clamping shoulder and skirt flange against said piston body cup.

5. The sprayer of claim 4 wherein said nut means comprises a nut threaded on an end of said bolt, a hollow nut cap fixed to the nut and having a closed end adjacent the open end of said hollow piston cup and having an open end with the retainer cup and adjacent the closed end of the retainer cup, and sealing means between the open end of said nut cap and said closed end of the retainer cup, thereby sealing said bolt from the interior of the piston chamber.

6. The sprayer of claim 5 wherein said sealing means comprises a deformable annular projection on the open end of said nut cap, and washer means positioned between said annular projection and the closed end of said retainer cup, whereby rotation of said nut on said bolt forces the end of said nut cap and said projection against said washer means to effect a tight seal between the nut cap and the inner closed end of the retainer cup and the bolt.

7. The sprayer of claim 1 wherein said diaphragm housing section includes an end having a threaded outer periphery and a clamping surface, and including means for clamping said housing cover and said diaphragm housing section together with said diaphragm peripheral edges clamped, said means for clamping comprises threaded means connected with said housing cover and threadedly engaged with said threaded peripheral of said diaphragm housing section.

8. The sprayer of claim 7 wherein said clamping surface of said diaphragm housing section includes a plurality of circumferentially spaced recesses spaced around the periphery thereof, and wherein said peripheral edge of said diaphragm includes a plurality of circumferentially spaced projections, each projection being received in a respective one of said recesses, whereby relative rotation of said diaphragm and said diaphragm housing section is restrained.

9. The sprayer of claim 7 including cooperating means on said diaphragm housing section and said diaphragm for restraining relative rotation of said diaphragm and diaphragm housing section.

10. The sprayer of claim 9 wherein said clamping means comprises an axially extending annular flange integral with the cover and having internal threads engaged with the threaded periphery of the diaphragm housing section, and wherein said cooperating means for restraining relative rotation comprises a plurality of circumferentially spaced recesses in said housing section and a plurality of projections on said diaphragm peripheral edge, said projections being respectively received in said recesses.

11. A dual pump comprising:
a pump housing having a piston housing section and a diaphragm housing section having a first peripheral sealing end,
a cover housing section connected to one end of said diaphragm housing section and having a second peripheral sealing end,
a stiff but resilient diaphragm having a peripheral edge captured between and sealed to said sealing ends,
means for pressing said sealing ends toward one another to clamp and seal said diaphragm peripheral edge therebetween,
a piston mounted within said housing sections and having a first end portion positioned at a central portion of said diaphragm, said piston cooperating with said piston housing section to form a piston chamber and cooperating with said diaphragm and diaphragm housing section to form a diaphragm chamber,
said piston having a second end remote from said diaphragm,
a skirt retainer connected to said piston and having a radially outwardly facing peripheral skirt mounting surface,
a sealing skirt extending about said skirt mounting surface,
bolt means extending through said diaphragm piston and retainer for fixedly securing together all of said skirt, retainer, piston, and diaphragm,
input and output passage means formed in said piston housing section for providing fluid communication with said piston chamber,
valve means for selectively blocking and unblocking said input and output passage means, and
port means for effecting fluid communication between said diaphragm chamber and an area external to said pump.

12. The pump of claim 11 wherein said skirt retainer comprises a cylindrical body having a first end positioned adjacent said first end portion of said piston, and having a second end adjacent said second end of said piston, said second end of said retainer having a clamp shoulder facing and spaced from said second end of said piston body, said skirt having an inwardly directed flange clamped to and between said retainer clamp shoulder and said second piston end.

13. The pump of claim 12 including means for resiliently urging said skirt radially outwardly relative to said skir mounting surface.

14. The pump of claim 11 wherein said piston comprises a hollow cylindrical body having a closed end positioned against a central portion of said diaphragm, and having an open end forming an annular clamping surface, said skirt retainer comprising a hollow cylindrical body having a closed end positioned within said piston body adjacent to but spaced from the closed end of said piston and having an open end, said open end of said skirt retainer including a radially outwardly extending enlargement forming a retainer clamp shoulder facing said piston clamping surface, said sealing skirt including a conical wall portion positioned against the outer surface of said skirt retainer enlargement, said skirt having an integral inwardly directed flange clamped between said retainer clamp shoulder and said piston clamping surface, and resilient means positioned between said conical wall portion of the skirt and said retainer enlargement for urging the skirt radially outwardly.

15. The pump of claim 14 wherein said bolt means extends through said diaphragm and through said closed end of said piston body for securing said piston to said diaphragm, said bolt means extending through said closed end of said skirt retainer, said bolt means including means for pressing said skirt retainer toward said piston body to thereby cause said retainer clamp shoulder to press said skirt against said piston body clamping surface, and to press said piston body against said diaphragm.

16. The pump of claim 14 wherein said bolt means extends through said diaphragm, through said piston body closed end, and through said retainer skirt closed end, said bolt means having a first fastening component positioned on a side of said diaphragm remote from said piston, and having a second fastening component positioned on a side of said retainer closed end portion remote from said diaphragm, said fastening components comprising means for urging said retainer toward said piston and diaphragm, thereby clamping said piston skirt and piston body between said retainer shoulder and said diaphragm.

17. The pump of claim 16 wherein said second fastening component comprises a nut threaded on said bolt shank and having a sealing nut cap fixed thereto, said bolt means having a threaded shank, said nut cap having a closed end remote from an end of said bolt and having an open end receiving said bolt end, said open end of said sealing nut cap including a longitudinally projecting sealing ridge, and a sealing washer circumscribing said bolt shank and interposed between said sealing ridge and the closed end of said skirt retainer, whereby said sealing ridge is pressed against said sealing washer to effectively seal the end of said bolt.

18. The pump of claim 17 including means for detachably connecting said diaphragm housing section to said cover section comprising an external threads formed on said sealing end of said diaphragm housing section, and an internal threaded flange fixedly connected to said cover housing section and threadedly engaged with said external threads.

19. The pump of claim 18 including means for resisting relative rotation of the diaphragm and said diaphragm housing section.

20. The pump of claim 19 wherein said means for resisting rotation comprises a plurality of circumferentially spaced recesses in said diaphragm section sealing end and a plurality of circumferentially spaced projections formed in said diaphragm and received respectively in individual ones of said recesses.

* * * * *